United States Patent
Ricotti

(10) Patent No.: US 8,813,633 B2
(45) Date of Patent: Aug. 26, 2014

(54) SYSTEM FOR DELIVERING INFUSION BEVERAGES AND INFUSION CAPSULE

(75) Inventor: Maddalena Ricotti, Casteggio (IT)

(73) Assignee: Babas, S.R.L., Calderara di Reno (BO) (IT)

( * ) Notice: Subject to any disclaimer, the term of this patent is extended or adjusted under 35 U.S.C. 154(b) by 452 days.

(21) Appl. No.: 12/811,570

(22) PCT Filed: Jan. 3, 2008

(86) PCT No.: PCT/IT2008/000003

§ 371 (c)(1),
(2), (4) Date: Jul. 2, 2010

(87) PCT Pub. No.: WO2009/084059

PCT Pub. Date: Jul. 9, 2009

(65) Prior Publication Data

US 2011/0111098 A1  May 12, 2011

(51) Int. Cl.
*A47J 31/00* (2006.01)

(52) U.S. Cl.
USPC .................. 99/295; 99/275; 99/284; 99/291; 99/302 R

(58) Field of Classification Search
USPC ................................ 99/275, 295, 284, 302 R
See application file for complete search history.

(56) References Cited

U.S. PATENT DOCUMENTS

| | | | |
|---|---|---|---|
| 3,800,690 A * | 4/1974 | Molenaar et al. | 99/295 |
| 6,786,136 B2 * | 9/2004 | Cirigliano et al. | 99/323 |
| 6,966,251 B2 | 11/2005 | Yoakim | |
| 7,543,527 B2 * | 6/2009 | Schmed | 99/295 |
| 7,559,273 B2 | 7/2009 | Levi et al. | |
| 2005/0066819 A1 * | 3/2005 | Cooke | 99/275 |
| 2005/0150391 A1 * | 7/2005 | Schifferle | 99/295 |
| 2005/0223904 A1 * | 10/2005 | Laigneau et al. | 99/295 |
| 2005/0266122 A1 * | 12/2005 | Franceschi | 426/77 |
| 2006/0174769 A1 * | 8/2006 | Favre et al. | 99/275 |
| 2006/0236871 A1 * | 10/2006 | Ternite et al. | 99/295 |
| 2008/0105130 A1 * | 5/2008 | Koeling et al. | 99/279 |
| 2008/0121111 A1 | 5/2008 | Paget et al. | |
| 2008/0216666 A1 * | 9/2008 | Doglioni Majer | 99/295 |
| 2010/0064899 A1 * | 3/2010 | Aardenburg | 99/295 |
| 2011/0274794 A1 * | 11/2011 | Gerbaulet et al. | 426/115 |
| 2013/0340626 A1 * | 12/2013 | Oh | 99/295 |

FOREIGN PATENT DOCUMENTS

| | | |
|---|---|---|
| EP | 1327407 A2 | 7/2003 |
| EP | 1518484 A1 | 9/2004 |
| FR | 547071 A | 11/1922 |
| FR | 2617389 A1 | 1/1989 |
| FR | 2849760 A1 | 7/2004 |
| FR | 2873011 A1 | 1/2006 |
| WO | 2005122851 A1 | 12/2005 |
| WO | 2007093355 A1 | 8/2007 |

\* cited by examiner

*Primary Examiner* — Henry Yuen
*Assistant Examiner* — Lawrence Samuels
(74) *Attorney, Agent, or Firm* — Volpe and Koenig, P.C.

(57) ABSTRACT

A system is described for delivering infusion beverages including at least one infusion capsule having an essence to be infused, at least one delivering manifold equipped with at least one housing seat of the capsule and at least one manifold for perforating and supplying water. The housing seat includes at least two different delivering ducts each one of which has a perforating end oriented towards an inside portion of the housing seat and a base of the capsule including at least one recess and one perforation portion. The recess and the perforation portion selectively correspond to the perforating end depending on a type of essence to be infused. An infusion capsule is also described.

3 Claims, 4 Drawing Sheets

SYSTEM FOR DELIVERING INFUSION BEVERAGES AND INFUSION CAPSULE

The present invention refers to a system for delivering infusion beverages and to a related infusion capsule.

As known, the prior art proposes an extremely wide variety of automatic or semi-automatic machines equipped with a preparing and delivering unit adapted to produce an infusion by passing hot water through a capsule containing the essence to be infused, such as, for example tea, coffee, tisanes, etc.

It is also known that the major inconvenience of this type of machines, due to the fact that the delivering circuit is unique and indistinct, and can therefore be contaminated by residuals of the delivered beverage, consists in their limited flexibility of use, that does not allow them to be easily adapted for preparing different types of beverages, unless at the expense of the final quality> of the delivered product.

In order to solve this problem, the prior art therefore has proposed different solutions to allow a single machine to produce different types of infusion beverages without impairing their quality, taste and organo-leptic properties. Examples of these solutions are disclosed in patents FR-A-547 071, FR-A-2 849 760, FR-A-2 617 389, FR-A-2 873 011, EP-A-1 327 407 and WO-A-2007/093355.

Object of the present invention is solving the above prior art problems by providing a system for delivering infusion beverages that allows preparing and delivering various types of infusion beverages without these latter ones being mutually contaminated.

Another object of the present invention is providing a system for delivering infusion beverages in which preparing and delivering various types of infusion beverages occur through at least one infusion capsule that can be easily used and economically produced.

A further object of the present invention is providing an infusion capsule that can be easily and flexibly used, and economically produced.

The above and other objects and advantages of the invention, as will appear from the following description, are obtained by a system for delivering infusion beverages as claimed in claim 1.

Moreover, the above and other objects and advantages of the invention are obtained with an infusion capsule as claimed in claim 5.

Preferred embodiments and non-trivial variations of the present invention are the subject matter of the dependent claims.

The present invention will be better described by some preferred embodiments thereof, provided as a non-limiting example, with reference to the enclosed drawings, in which:

FIG. 1b shows a perspective view of the system for delivering infusion beverages of FIG. 1a;

FIG. 1c shows another perspective view of the system for delivering infusion beverages of FIG. 1a;

FIG. 2b shows a side view of the capsule in FIG. 2a.

Figure 1A:
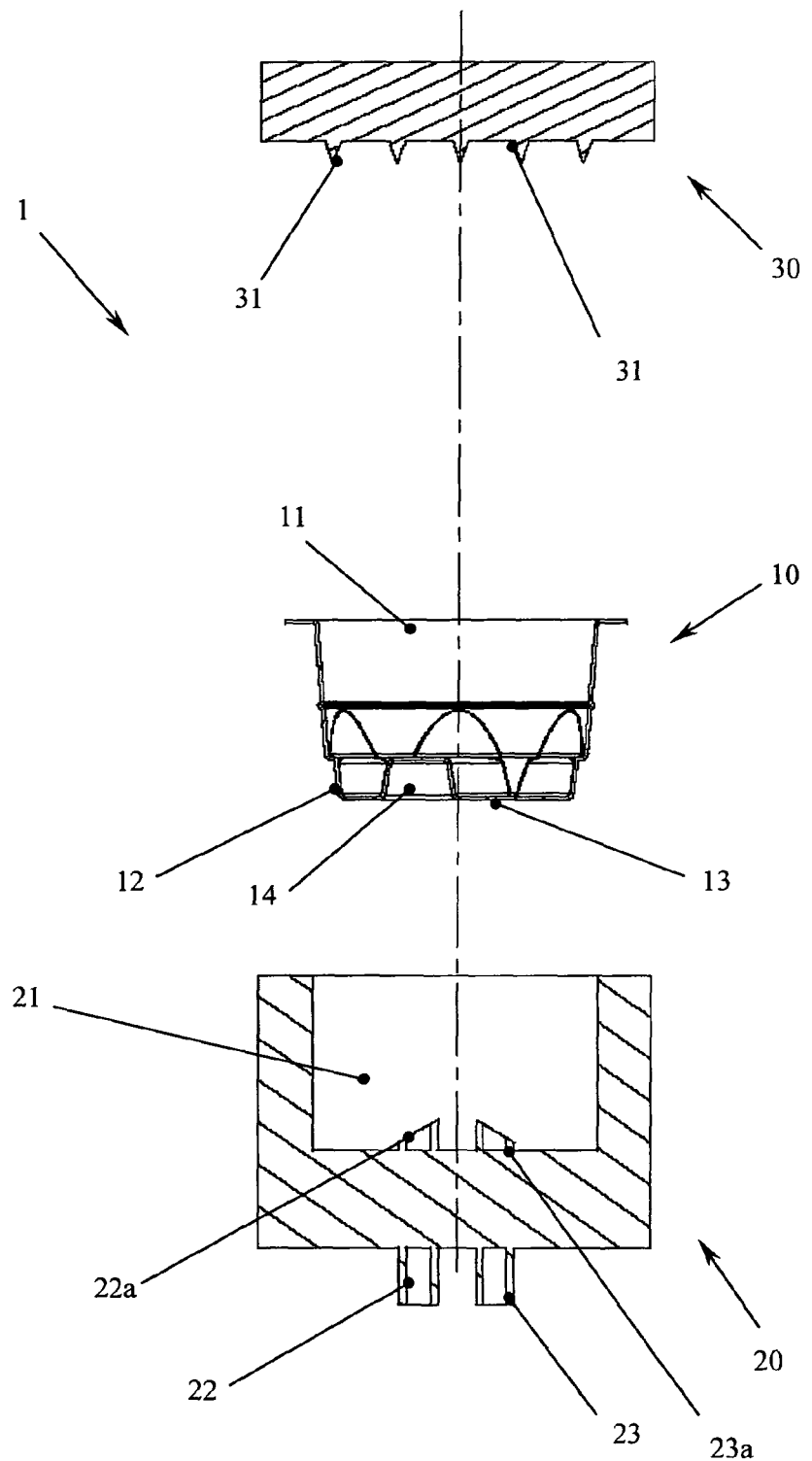
FIG. 1a shows an exploded side sectional view of a preferred embodiment of the system for delivering infusion beverages according to the present invention.
Figure 1B:
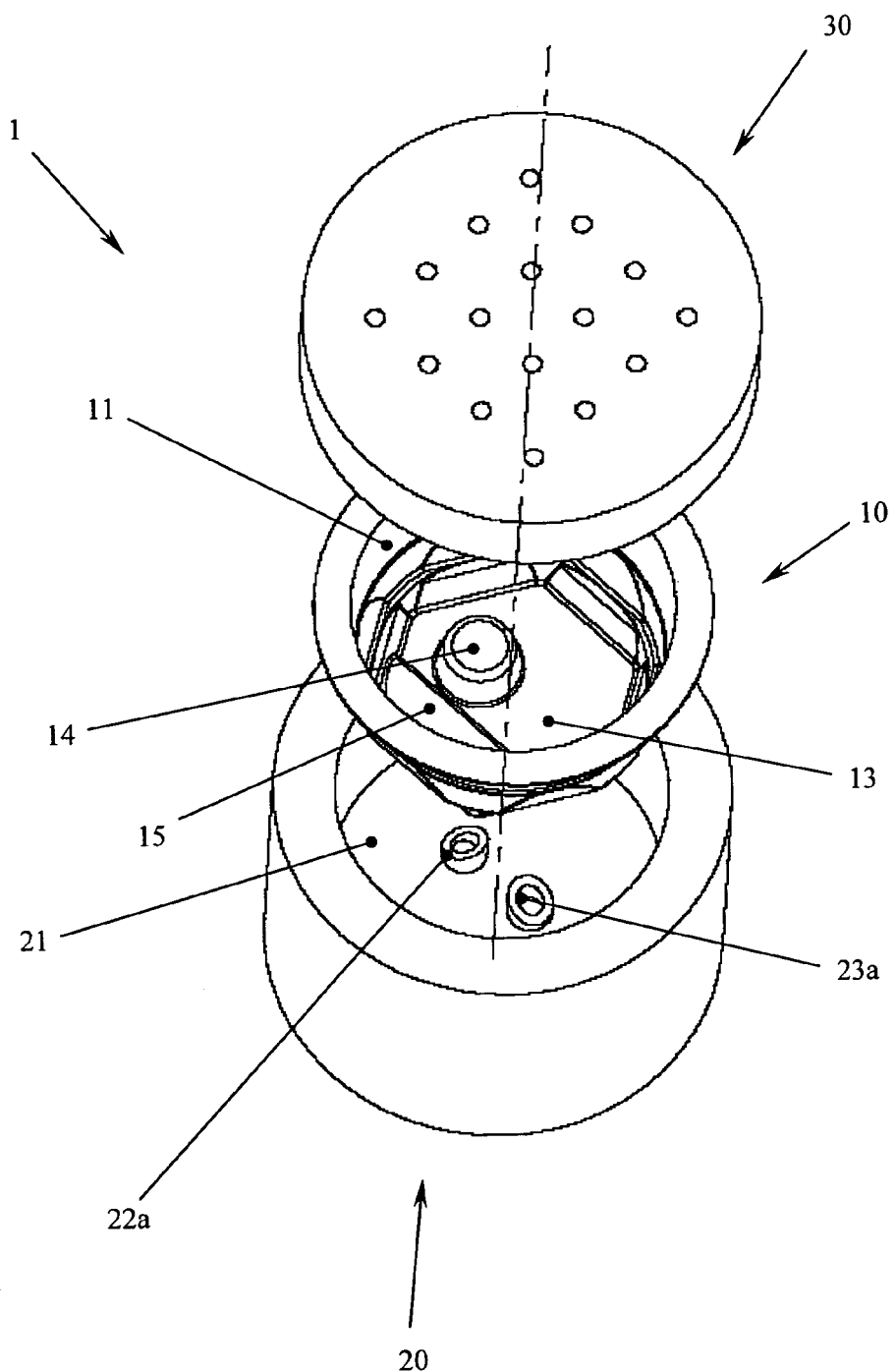
Figure 1C:
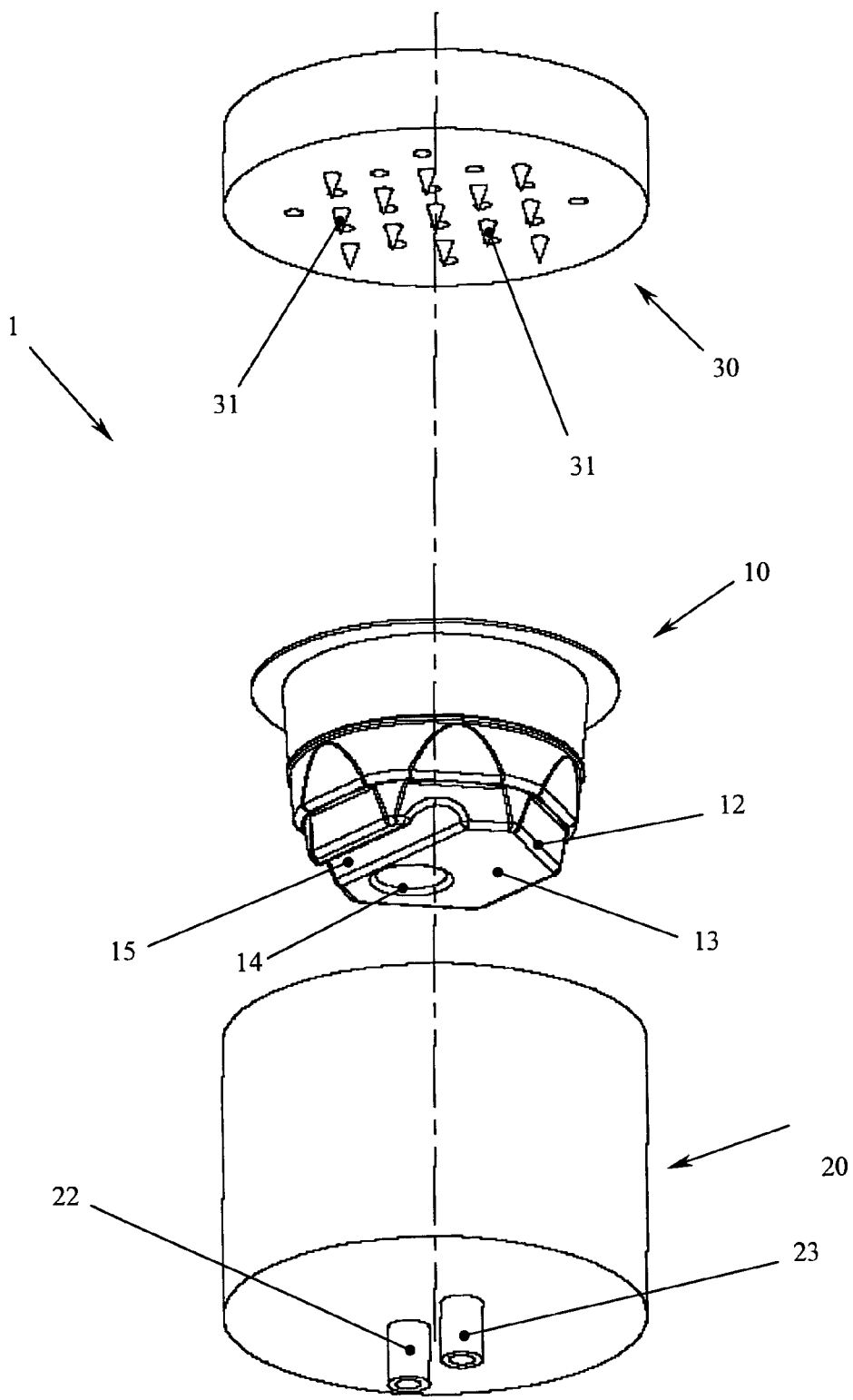

It will be immediately obvious that numerous variations and modifications (for example related to shape, sizes, arrangements and parts with equivalent functionality) can be made to what is described, without departing from the scope of the invention as appears from the enclosed claims.

With reference to the Figures, it can be noted that the system 1 for delivering infusion beverages according to the present invention comprises at least one infusion capsule 10 containing inside it an essence to be infused (not shown), at least one delivering manifold 20, equipped inside it with at least one housing seat 21 for such capsule 10, and at least one manifold for perforating and supplying water 30.

In particular, inside the housing seat 21 at least two different delivering ducts, respectively 22 and 23, are arranged, each one of which has a perforating end, respectively 22a and 23a, oriented towards inside the housing seat 21 of the delivering manifold 20. Each delivering duct 22, 23 is aimed for delivering a particular type of infusion beverage so that there is no contamination of such beverage with residuals deriving from the previous delivery, in the same duct, of a beverage of a different type.

The capsule 10 therefore comprises at least one upper opening 11, through which infusion water flows, provided by the manifold for perforating and supplying water 30 and at least one base 12. The opening 11 can be covered with at least one layer of protecting material (not shown), such as for example an aluminium film or a layer of filter paper, that can be perforated, to allow the passage of infusion water inside it, by a plurality of punches 31 with which the manifold for perforating and supplying water 30 is equipped on its surface, every time this latter one is brought to abut against the capsule 10.

In particular, the base 12 comprises at least one perforation portion 13 that can be perforated by one and only one perforating end 22a or 23a, and at least one recess 14 adapted to accommodated therein the remaining perforating end 23a or 22a. In the particular, and in no way limiting, case of the system 1 shown in the Figures, it is possible to note that the capsule 10 is placed inside the housing seat 21 in such a way that the perforation portion 13 is perforated by the right perforating end 23a, while the left perforating end 22a is accommodated inside its respective recess 14 without thereby performing any perforation in the capsule 10. The perforation in the base 12 thereby creates an outlet opening in the capsule 10 for the infusion that is created inside the capsule 10 through administering hot, cold or tepid water, by the manifold for perforating and supplying water 30 through the upper opening 11: the infusion beverage, in the examined case, will then be delivered through the right delivering duct 23. Obviously, the number of delivering ducts can be any, and in particular depending on the sizes of the delivering manifold 20 and the base 12 of the capsule 10. Taking into account, therefore, an integer number N of delivering ducts, and of related perforating ends, the number of recesses 14 being present on the base 12 of the capsule 10 will be N−1. The arrangement of the N−1 recesses 14 on the base 12 is therefore such as to selectively correspond to the arrangement of the N−1 perforating ends that must not perforate the base 12, while the perforation portion 13 is next to the particular perforating end related to the specific delivering duct to be used for delivering the specific beverage. In particular, the specific arrangement of the N−1 recesses 14 on the base 12 is function of the type of essence to be infused contained inside the capsule 10, and consequently the specific delivering duct to be used: different arrangements of recesses 14 on the base 12 thereby correspond to different types of essences contained inside the capsule 10.

In order to make univocal the correspondence between different arrangements of recesses 14 of the base 12 with the perforating end depending on different types of beverages to be delivered, and therefore allow the correct orientation of the capsule 10 inside the housing seat 21, the system 1 according to the present invention further comprises means for compulsorily placing the capsule 10 with respect to the housing seat 21 of the delivering manifold 20. In its preferred embodiment, the compulsory placing means comprise at least one guide groove 15, arranged asymmetrically along the base 12 of the capsule 10 adapted to correspond to a related projection (not shown) arranged in the housing seat 21 of the delivering manifold 20.

Merely as an example, once having chosen the specific type of beverage, for example coffee, to be prepared by the system 1 according to the present invention, it is enough to insert the related capsule 10 inside the housing seat 21 of the delivering manifold 20: N−1 recesses 14 will correspond to N−1 perforating ends while the perforating end related to the coffee delivering duct will correspond to the specific coffee delivering duct: such univocal correspondence is guaranteed by the compulsory placing means. The manifold for perforating and supplying water 30, once having possibly perforated the protecting layer that covers the opening 11 of the capsule 10, will deliver water through the substance to be infused, afterwards going out as beverage through the perforation obtained on the base 12 from the specific perforating end. If, in the following operating cycle, it is required to prepare and deliver a different type of beverage, such as for example tea, the related capsule 10 will have a different arrangement of recesses 14 with respect to the previously-used capsule, so that its perforation portion 13 will correspond to a different delivering duct, also specific for the new beverage, thereby excluding any possible contamination with possible residuals deriving from the preparation of the previous beverage.

Figure 2B:
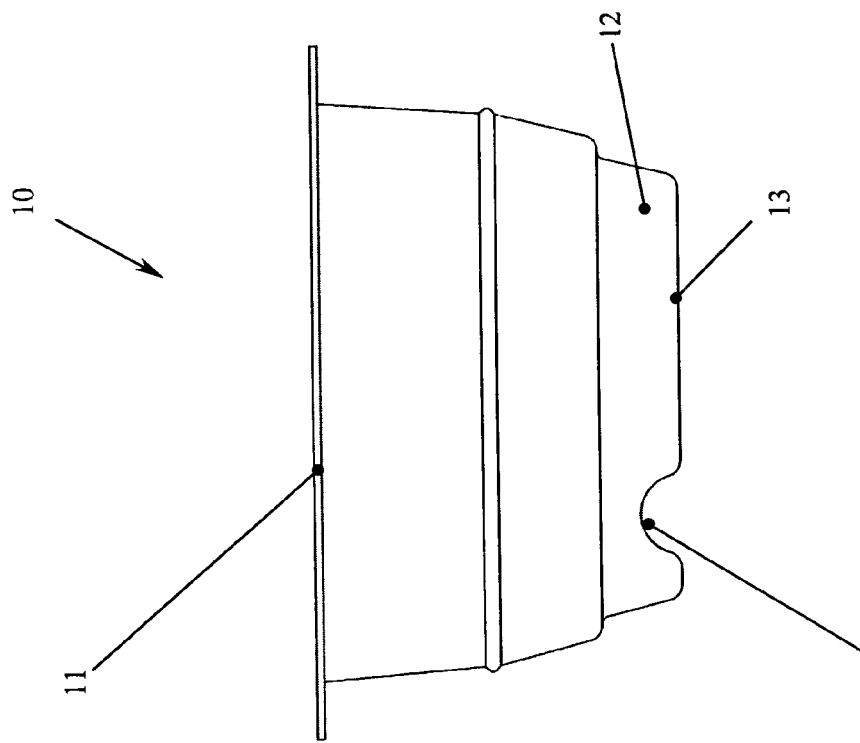
Figure 2A:
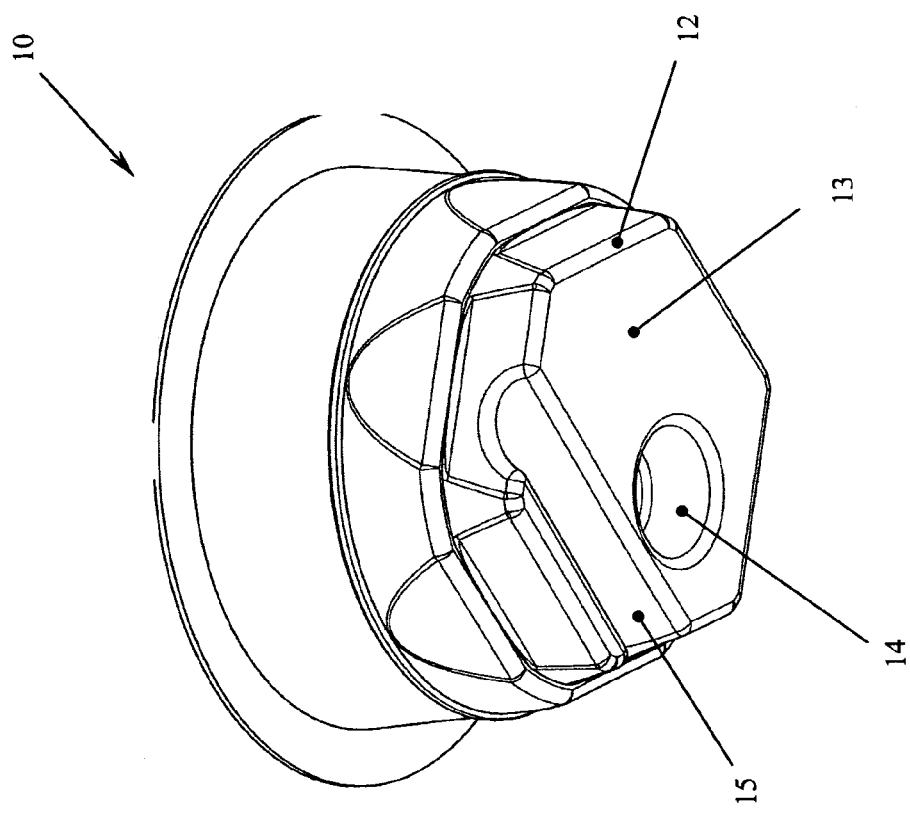
FIG. 2a shows a perspective view of a preferred embodiment of an infusion capsule according to the present invention.

With particular reference to FIGS. 2a and 2b, the present invention also specifically deals with an infusion capsule 10 adapted to be used with a system 1 like the one according to the present invention. In particular, the capsule 10 according to the present invention containing inside it an essence to be infused comprises at least one base 12 equipped with at least one recess 14 and one perforation portion 13, such recess 14 and such perforation portion 13 being arranged depending on the type of essence to be infused. The capsule 10 according to the present invention further comprises compulsory placing means. In a preferred embodiment thereof, like the one for example shown in the Figures, the compulsory placing means consist in at least one guide groove 15 arranged asymmetrically along the base 12.

The invention claimed is:

1. System (1) for delivering infusion beverages comprising at least one infusion capsule (10) comprising an essence to be infused, at least one delivering manifold (20) comprising at least one housing seat (21) of said capsule (10) and at least one manifold for perforating and supplying water (30), wherein said at least one housing seat (21) comprises at least two different delivering ducts (22, 23) each one of which has a perforating end (22a, 23a) oriented towards an inside portion of said housing seat (21), and is configured to deliver a particular type of infusion beverage so that there is no contamination of such beverage with residuals deriving from a previous delivery, and a base (12) of said capsule (10) comprises at least one recess (14) and one perforation portion (13), said recess (14) and said perforation portion (13) being arranged on the base (12) depending on a type of said essence to be infused contained inside the capsule (10) and selectively corresponding with said perforating end (22a, 23a) depending on a type of said essence to be infused; the system further comprising means for compulsorily placing said capsule (10) with respect to said housing seat (21) of said delivering manifold (20), such that said perforation portion (13) is perforated by the perforating end (22a, 23a) of the delivering duct which is configured to deliver the particular type of infusion beverage contained inside the capsule, while the remaining perforating end is accommodated inside its respective recess (14) without thereby performing any perforation in the capsule (10).

2. System (1) according to claim 1, wherein said means for compulsorily placing comprise at least one guide groove (15) arranged asymmetrically along said base (12) of said capsule (10) and a corresponding projection arranged in said housing seat (21) of said delivering manifold (20).

3. System (1) according to claim 1, wherein said manifold for perforating and supplying water (30) comprises a plurality of punches (31) for perforating at least one layer of protecting material of an upper opening (11) of said capsule (10).

* * * * *